(No Model.)
C. P. GOERZ & E. VON HOEGH.
LENS FOR OPTICAL PURPOSES.
No. 547,207.            Patented Oct. 1, 1895.
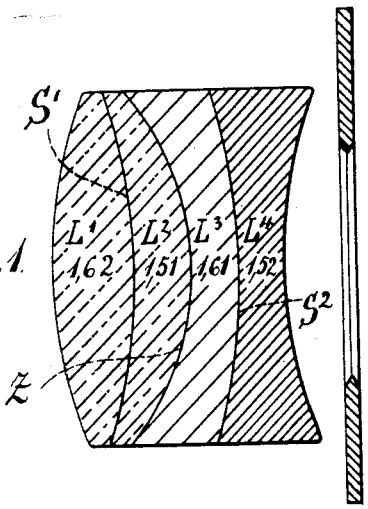
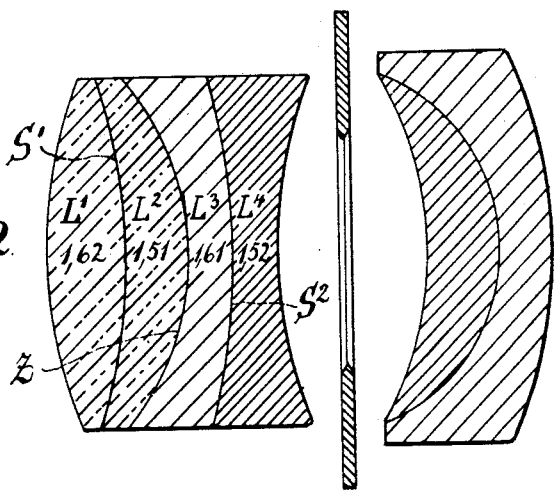
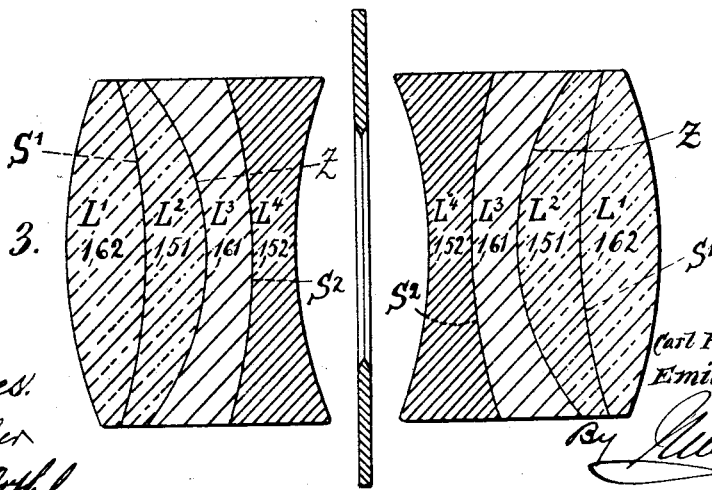
Witnesses:
B. S. Ober
Henry Orth
Inventors,
Carl Paul Goerz
Emil von Hoegh
By
Attorney

UNITED STATES PATENT OFFICE.

CARL PAUL GOERZ, OF SCHÖNEBERG, AND EMIL VON HOEGH, OF WILMERSDORF, GERMANY.

LENS FOR OPTICAL PURPOSES.

SPECIFICATION forming part of Letters Patent No. 547,207, dated October 1, 1895.

Application filed July 18, 1895. Serial No. 556,308. (No model.)

*To all whom it may concern:*

Be it known that we, CARL PAUL GOERZ, of Schöneberg, and EMIL VON HOEGH, of Wilmersdorf, Germany, have invented certain new and useful Improvements Relating to Lenses for Optical Purposes; and we do hereby declare the following to be a clear and exact description of the invention.

Our invention has relation to lenses for optical purposes; and it has for its object the production of a lens free from astigmatic and spherical errors and having great light-power.

Figures 1 to 3 are sectional views of our compound lenses.

Similar letters of reference indicate like parts.

Nearly all known photographic objectives of greatest light-power produce great astigmatic errors, so that they give a sharp image only in the middle of the plate, while the part at the edge becomes not sharp. On the other hand, those objectives which have been made free from astigmatic errors have less light-power, so that their use is much restricted in such cases where great light-power is required.

The objective of the present invention combines both properties. It has a great light-power and is free from producing an astigmatic curvature of the image.

As shown in the drawings, Fig. 1, the objective consists of four single lenses juxtaposited and cemented together.

The first lens $L'$ is a positive and a bi-convex one, having high refraction, (1.62.) The second lens $L^2$ is also a positive and a concave-convex lens of less refraction, (1.51.) Then follow upon the latter two negative lenses $L^3$ $L^4$, from which the first is a concave-convex one and possesses the greater refraction (1.61) and the second a bi-concave lens having less refraction, (1.52.) Thus the surfaces $S'$ and $S^2$, cemented together, act light-collecting, and the cemented surface $z$ light-dispersing, in such manner that the astigmatic errors produced by the surface Z, and by which otherwise the part at the edge would become not sharp, are removed by the surfaces $S'$ and $S^2$ acting in an opposite sense. On the other hand, the spherical errors produced on the surfaces $S'$ and $S^2$ and by which otherwise the middle of the image would become not sharp, are removed by the surface Z acting in an opposite sense.

The described objective may be used as single objective or may be combined with another single system, as represented in Fig. 2, or it may be used as a symmetric double objective, as shown in Fig. 3.

Having thus described our invention and in what manner the same is to be performed, what we claim as new therein, and desire to secure by Letters Patent, is—

A photographic objective consisting of four single lenses juxtaposited and cemented together, of which two juxtaposited lenses are positive and of different refraction and two juxtaposited lenses are negative and of different refraction in such manner that a lens of less refraction is juxtaposited to a lens of higher refraction, for the purpose set forth.

CARL PAUL GOERZ.
    EMIL VON HOEGH.

Witnesses:
 RICHARD SCHMIDT,
 RICHARD JONSCHER.